(12) United States Patent
Birau et al.

(10) Patent No.: US 7,427,323 B1
(45) Date of Patent: *Sep. 23, 2008

(54) QUINACRIDONE NANOSCALE PIGMENT PARTICLES

(75) Inventors: Maria M. Birau, Mississauga (CA); Rina Carlini, Mississauga (CA); C. Geoffrey Allen, Waterdown (CA); Sandra J. Gardner, Oakville (CA); Karl W. Dawson, Ottawa (CA); Peter G. Odell, Mississauga (CA); Paul F. Smith, Oakville (CA); Caroline M. Turek, Hamilton (CA); Roger E. Gaynor, Oakville (CA); Jeffrey H. Banning, Hillsboro, OR (US)

(73) Assignee: Xerox Corporation, Norwalk, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/759,906

(22) Filed: Jun. 7, 2007

(51) Int. Cl.
C09B 48/00 (2006.01)
C09B 67/20 (2006.01)
C09B 67/52 (2006.01)
C09D 11/00 (2006.01)

(52) U.S. Cl. .................... 106/497; 106/31.77; 106/495; 546/49; 546/56

(58) Field of Classification Search .............. 106/31.77, 106/495, 497; 546/49, 56
See application file for complete search history.

(56) References Cited

U.S. PATENT DOCUMENTS

| | | | |
|---|---|---|---|
| 3,201,402 A | 8/1965 | Bohler et al. | |
| 3,261,837 A | 7/1966 | Bohler et al. | |
| 4,830,671 A | 5/1989 | Frihart et al. | |
| 4,889,560 A | 12/1989 | Jaeger et al. | |
| 4,889,761 A | 12/1989 | Titterington et al. | |
| 5,194,638 A | 3/1993 | Frihart et al. | |
| 5,278,020 A | 1/1994 | Grushkin et al. | |
| 5,290,654 A | 3/1994 | Sacripante et al. | |
| 5,308,734 A | 5/1994 | Sacripante et al. | |
| 5,344,738 A | 9/1994 | Kmiecik-Lawrynowicz et al. | |
| 5,346,797 A | 9/1994 | Kmiecik-Lawrynowicz et al. | |
| 5,364,729 A | 11/1994 | Kmiecik-Lawrynowicz et al. | |
| 5,370,963 A | 12/1994 | Patel et al. | |
| 5,372,852 A | 12/1994 | Titterington et al. | |
| 5,403,693 A | 4/1995 | Patel et al. | |
| 5,418,108 A | 5/1995 | Kmiecik-Lawrynowicz et al. | |
| 5,597,856 A | 1/1997 | Yu et al. | |
| 5,679,138 A | 10/1997 | Bishop et al. | |
| 6,174,937 B1 | 1/2001 | Banning et al. | |
| 6,399,713 B1 | 6/2002 | MacQueen et al. | |
| 6,492,458 B1 | 12/2002 | Pavlin et al. | |
| 6,537,364 B2 | 3/2003 | Dietz et al. | |
| 6,837,918 B2 | 1/2005 | Pozarnsky et al. | |
| 6,864,371 B2 * | 3/2005 | Babler ......................... 546/49 |
| 6,902,613 B2 | 6/2005 | Babler et al. | |
| 7,211,139 B2 * | 5/2007 | Robertson et al. ........... 106/497 |
| 2003/0065084 A1 | 4/2003 | MacQueen et al. | |
| 2003/0199608 A1 | 10/2003 | Kamigaki et al. | |
| 2005/0109240 A1 | 5/2005 | Maeta et al. | |
| 2006/0063873 A1 | 3/2006 | Lin et al. | |
| 2007/0012221 A1 | 1/2007 | Maeta et al. | |
| 2007/0120921 A1 | 5/2007 | Carlini et al. | |
| 2007/0120924 A1 | 5/2007 | Obell et al. | |

FOREIGN PATENT DOCUMENTS

| | | |
|---|---|---|
| CH | 372316 | 11/1963 |
| CH | 404034 | 6/1966 |
| GB | 2 238 792 | 6/1991 |
| JP | 2005238342 A2 | 9/2005 |
| JP | 2007023168 | 2/2007 |
| JP | 2007023169 | 2/2007 |
| WO | 2004/026967 | 4/2004 |
| WO | 2004/048482 | 6/2004 |
| WO | 2006/005521 | 1/2006 |
| WO | 2006/005536 | 1/2006 |
| WO | 2006/011467 | 2/2006 |
| WO | 2006/024103 | 3/2006 |
| WO | 2006/132443 | 12/2006 |

OTHER PUBLICATIONS

U.S. Appl. No. 11/759,906, filed Jun. 7, 2007.
Hideki Maeta et al., "New Synthetic Method of Organic Pigment Nano Particle by Micro Reactor System," http://aiche.confex.com/aiche/s06/preliminaryprogram/abstract_40072.htm (date unknown).
K. Balakrishnan et al., "Effect of Side-Chain Substituents on Self-Assembly of Perylene Diimide Molecules: Morphology Control," *J. Am. Chem. Soc.*, vol. 128, pp. 7390-7398 (2006), no month.
Kazuyuki Hayashi et al., "Uniformed nano -downsizing of organic pigments through core-shell structuring," Journal of Materials Chemistry , 17(6), 527-530 (2007), no month.
Kento Ujiiye-Ishii et al., "Mass-Production of Pigment Nanocrystals by the Reprecipitation Method and their Encapsulation," *Molecular Crystals and Liquid Crystals*, v. 445, p. 177 (2006), no month.
W. Herbst, K. Hunger, *Industrial Organic Pigments*, "Quinacridone Pigments" Wiley-VCH Third Edition, p. 452-472 (2004), no month.
F. Kehrer, "Neuere Entwicklung auf den Gebiet der Chemie organischer Pigmentfarbstoffe," Chimia, vol. 28(4), p. 173-183 (1974), no month.
B.R. Hsieh et al, "Organic Pigment Nanoparticle Thin Film Devices via Lewis Acid Pigment Solubilization and In Situ Pigment Dispersions," Journal of Imaging Science and Technology, vol. 45(1), p. 37-42 (2001), no month.

* cited by examiner

*Primary Examiner*—Anthony J Green
(74) *Attorney, Agent, or Firm*—Oliff & Berridge, PLC

(57) ABSTRACT

A nanoscale pigment particle composition includes a quinacridone pigment including at least one functional moiety, and a sterically bulky stabilizer compound including at least one functional group, wherein the functional moiety associates non-covalently with the functional group; and the presence of the associated stabilizer limits the extent of particle growth and aggregation, to afford nanoscale-sized particles.

30 Claims, No Drawings

QUINACRIDONE NANOSCALE PIGMENT PARTICLES

TECHNICAL FIELD

This disclosure is generally directed to nanoscale quinacridone pigment particles, and methods for producing such nanoscale quinacridone pigment particles, as well as to uses of such compositions, for example, in ink compositions. Such particles are useful, for example, as nanoscopic colorants for such compositions as inks and the like, such as ink jet ink compositions, phase change ink compositions, and non-aqueous liquid ink compositions.

CROSS-REFERENCE TO RELATED APPLICATIONS

Disclosed in commonly assigned U.S. patent application Ser. No. 11/759.913 to Rina Carlini et al. filed Jun. 7, 2007 is a nanoscale pigment particle composition, comprising: an organic monoazo laked pigment including at least one functional moiety, and a sterically bulky stabilizer compound including at least one functional group, wherein the functional moiety associates non-covalently with the functional group; and the presence of the associated stabilizer limits the extent of particle growth and aggregation, to afford nanoscale-sized pigment particles. Also disclosed is a process for preparing nanoscale-sized monoazo laked pigment particles, comprising: preparing a first reaction mixture comprising: (a) a diazonium salt including at least one functional moiety as a first precursor to the laked pigment and (b) a liquid medium containing diazotizing agents generated in situ from nitrous acid derivatives; and preparing a second reaction mixture comprising: (a) a coupling agent including at least one functional moiety as a second precursor to the laked pigment and (b) a sterically bulky stabilizer compound having one or more functional groups that associate non-covalently with the coupling agent; and (c) a liquid medium combining the first reaction mixture into the second reaction mixture to form a third solution and effecting a direct coupling reaction which forms a monoazo laked pigment composition wherein the functional moiety associates non-covalently with the functional group and having nanoscale particle size. Further disclosed is a process for preparing nanoscale monoazo laked pigment particles, comprising: providing a monoazo precursor dye to the monoazo laked pigment that includes at least one functional moiety; subjecting the monoazo precursor dye to an ion exchange reaction with a metal cation salt in the presence of a sterically bulky stabilizer compound having one or more functional groups; and precipitating the monoazo laked pigment as nanoscale particles, wherein the functional moiety of the pigment associates non-covalently with the functional group of the stabilizer and having nanoscale particle size.

The entire disclosure of the above-mentioned application is totally incorporated herein by reference.

BACKGROUND

Pigments are a class of colorants useful in a variety of applications such as for example paints, plastics and inks. Dyes have typically been the colorants of choice for inkjet printing inks because they are readily soluble colorants which provide the main means for the optical contrast of an image jetted onto a given substrate such as paper and, importantly, do not hinder the reliable jetting of the ink. Dyes have also offered superior and brilliant color quality with an expansive color gamut for inks, when compared with conventional pigments. However since dyes are molecularly dissolved in the ink vehicle, they are often susceptible to unwanted interactions that lead to poor ink performance, for example photo-oxidation from light (will lead to poor lightfastness), dye diffusion from the ink into paper or other substrates (will lead to poor image quality and showthrough), and the ability for the dye to leach into another solvent that makes contact with the image (will lead to poor water/solventfastness). In certain situations, pigments are the better alternative as colorants for inkjet printing inks since they are insoluble and cannot be molecularly dissolved within the ink matrix, and therefore do not diffuse as dyes do through the image and/or into the substrate on which the image resides. Pigments can also be significantly less expensive than dyes, and so are attractive colorants for use in all printing inks.

Key issues with using pigments for inkjet inks are their large particle sizes and wide particle size distribution, the combination of which can pose critical problems with reliable jetting of the ink (i.e. inkjet nozzles are easily blocked). Pigments are rarely obtained in the form of single crystal particles, but rather as large aggregates of crystals and with wide distribution of aggregate sizes. The color characteristics of the pigment aggregate can vary widely depending on the aggregate size and crystal morphology. Thus, there is a need addressed by embodiments of the present invention, for smaller pigment particles that minimize or avoid the problems associated with conventional pigment particles. The present nanosized pigment particles are useful in for example paints, coatings and inks (e.g., inkjet printing inks) and other compositions where pigments can be used such as plastics, optoelectronic imaging components, photographic components and cosmetics.

A printing ink is generally formulated according to strict performance requirements demanded by its intended market application and desired properties. Whether formulated for office printing or for production printing, a particular ink is expected to produce images that are robust and durable under stress conditions, such as exposure to abrasive or sharp objects or actions that produce a crease defect in the image (such as folding or scratching the imaged paper). For example, in a typical design of a piezoelectric ink jet device, the image is applied by jetting appropriately colored inks during four to six rotations (incremental movements) of a substrate (an image receiving member or intermediate transfer member) with respect to the ink jetting head, i.e., there is a small translation of the printhead with respect to the substrate in between each rotation. This approach simplifies the printhead design, and the small movements ensure good droplet registration. At the jet operating temperature, droplets of liquid ink are ejected from the printing device and, when the ink droplets contact the surface of the recording substrate, either directly or via an intermediate heated transfer belt or drum, they quickly solidify to form a predetermined pattern of solidified ink drops.

Hot melt inks typically used with ink jet printers can include at least one wax, for example, a crystalline wax and/or a semi-crystalline wax and at least one amorphous resin in the ink vehicle. Such solid ink jet inks provide vivid color images. In some embodiments, these crystalline wax-based inks partially cool on an intermediate transfer member, for example, a transfer drum or belt, and are then transferred onto the image receiving medium such as paper, for example. This action of image transference onto a substrate such as paper spreads the image droplet, providing a richer color and lower pile height. The low flow of the solid ink also prevents show through on the paper. However, the use of crystalline waxes places limitations for printing, such as the brittleness of these materials which may reduce the ink's robustness properties that are required to provide abrasion-resistant images. Consequently, increased mechanical robustness is desired.

U.S. Pat. No. 6,902,613 discloses a mixture of an organic nanosize pigment comprising of from 50 to 99% by weight of the nanosize pigment and 1 to 50% by weight based of a low molecular weight naphthalene sulfonic acid formaldehyde polymer and its use as a particle growth and crystal phase director for the preparation of a direct pigmentary organic pigment or in pigment finishing.

WO 2004/048482 discloses a mixture of an organic nanosize pigment comprising of from 50 to 99% by weight of the nanosize pigment and 1 to 50% by weight based of a low molecular weight polysulfonated hydrocarbon, in particular naphthalene mono- or disulfonic acid formaldehyde polymer, and its use as a particle growth and crystal phase director for the preparation of a direct pigmentary organic pigment or in pigment finishing.

U.S. Patent Application Publication No. 2006/0063873 discloses a process for preparing nano water paint comprising the steps of: A. modifying the chemical property on the surface of nano particles by hydroxylation for forming hydroxyl groups at high density on the surface of the nano particles; B. forming self-assembly monolayers of low surface energy compounds on the nano particles by substituting the self-assembly monolayers for the hydroxyl groups on the nano particles for disintegrating the clusters of nano particles and for forming the self-assembly monolayers homogeneously on the surface of the nano particles; and C. blending or mixing the nano particles having self-assembly monolayers formed thereon with organic paint to form nano water paint.

U.S. Patent Application Publication No. 2005/0109240 describes a method of producing a fine particle of an organic pigment, containing the steps of: flowing a solution of an organic pigment dissolved in an alkaline or acidic aqueous medium, through a channel which provides a laminar flow; and changing a pH of the solution in the course of the laminar flow.

U.S. Pat. No. 3,201,402 discloses a process for the production of pigment dyestuffs of the quinacridone-7,14-dione series, which consists of reaction 1 more of 2,5-dihalogenoterephthalic acid and one or more of its esters either simultaneously or successively with 2 moles of an aromatic amine or of a mixture of different aromatic amines, in which at least one position ortho to the amino group is free, and converting the resulting 2,5-diarylaminoterephthalic acid or its ester into a quinacridone-7,14-dione by heating at a high temperature in an acid condensation medium, if desired in presence of an inert organic solvent.

Kento Ujiiye-Ishii et al., "Mass-Production of Pigment Nanocrystals by the Reprecipitation Method and their Encapsulation," *Molecular Crystals and Liquid Crystals*, v. 445, p. 177 (2006) describes that quinacridone nanocrystals with controlled size and morphology were readily fabricated by using a pump as an injection apparatus of the reprecipitation method for mass-production and injecting concentrated N-methyl-2-pyrrolidinone solution. The reference describes that encapsulation of quinacridone nanocrystals using polymer was achieved and quite improved dispersibility was confirmed for the encapsulated nanocrystals.

Hideki Maeta et al., "New Synthetic Method of Organic Pigment Nano Particle by Micro Reactor System," in an abstract available on the internet, describes a new synthetic method of an organic pigment nano particle was realized by micro reactor. A flowing solution of an organic pigment, which dissolved in an alkaline aqueous organic solvent, mixed with a precipitation medium in a micro channel. Two types of micro reactor can be applied efficiently on this buildup procedure without blockage of the channel. The clear dispersion was extremely stable and had narrow size distribution, which were the features, difficult to realize by the conventional pulverizing method (breakdown procedure). These results proved the effectiveness of this process on micro reactor system.

WO 2006/132443 A1 describes a method of producing organic pigment fine particles by allowing two or more solutions, at least one of which is an organic pigment solution in which an organic pigment is dissolved, to flow through a microchannel, the organic pigment solution flows through the microchannel in a non-laminar state. Accordingly, the contact area of solutions per unit time can be increased and the length of diffusion mixing can be shortened, and thus instantaneous mixing of solutions becomes possible. As a result, nanometer-scale monodisperse organic pigment fine particles can be produced in a stable manner.

K. Balakrishnan et al., "Effect of Side-Chain Substituents on Self-Assembly of Perylene Diimide Molecules: Morphology Control," *J. Am. Chem. Soc.*, vol. 128, p. 7390-98 (2006) describes the use of covalently-linked aliphatic side-chain substituents that were functionalized onto perylene diimide molecules so as to modulate the self-assembly of molecules and generate distinct nanoparticle morphologies (nano-belts to nano-spheres), which in turn impacted the electronic properties of the material. The side-chain substituents studied were linear dodecyl chain, and a long branched nonyldecyl chain, the latter substituent leading to the more compact, spherical nanoparticle.

WO 2006/011467 discloses a pigment, which is used, for example, in color image display devices and can form a blue pixel capable of providing a high level of bright saturation, particularly a refined pigment, which has bright hue and is excellent in pigment properties such as lightfastness, solvent resistance and heat resistance, and a process for producing the same, a pigment dispersion using the pigment, and an ink for a color filter. The pigment is a subphthalocyanine pigment that is prepared by converting subphthalocyanine of the specified formula, to a pigment, has diffraction peaks at least at diffraction angles (2θ) 7.0°, 12.3°, 20.4° and 23.4° in X-ray diffraction and an average particle diameter of 120 to 20 nm.

WO 2006/024103 discloses nanopigments prepared from organic IR dye and Na-bentonite with CEC of 95 mmole Na per 100 g of bentonite, at room temperature, by dissolving the Na-bentonite in water and mixing for 2 hours, and mixing in the dye, dissolved in ethanol, for 18 hours. The precipitate is filtered, washed three times with water/ethanol mixture, dried at 105° C. for 10 hours, and milled in a kitchen miller for 2 mins. 0.3 parts of the nanopigments were mixed to 100 parts of pulverized SPG resin and processed in an extruder with a die temperature of 190° C. to form transparent, faintly green or grey colored extrudates which were used to press film of 0.4 mm thickness at 160° C. The films were used to prepare IR-active laminated glass. Near infrared absorption spectra of the glass structures were obtained in a Perkin-Elmer Spectrophotometer.

WO 2006/005521 discloses a photoprotective composition, in a physiologically acceptable medium: a) at least one aqueous phase, b) at least hydrophilic metal oxide nanoparticles, c) at least one vinylpyrrolidone homopolymer. The reference also discloses the use of at least one vinylpyrrolidone homopolymer in a photoprotective composition comprising at least one aqueous phase and at least hydrophilic metal oxide nanoparticles for the purpose of reducing the whitening and/or of improving the stability of the said composition.(dispersibility of the nanoparticles in the aqueous phase).

WO 2006/005536 discloses a method for producing nanoparticles, in particular, pigment particles. Said method consists of the following steps: (i) a raw substance is passed into the gas phase, (ii) particles are produced by cooling or reacting the gaseous raw substance and (iii) an electrical charge is applied to the particles during the production of the particles in step (ii), in a device for producing nanoparticles. The disclosure further relates to a device for producing nanoparticles, comprising a supply line, which is used to transport the gas flow into the device, a particle producing and charging area in order to produce and charge nanoparticles at essentially the same time, and an evacuation line which is used to transport the charged nanoparticles from the particle producing and charging area.

Japanese Patent Application Publication No. JP 2005238342 A2 discloses irradiating ultrashort pulsed laser to organic bulk crystals dispersed in poor solvents to induce ablation by nonlinear absorption for crushing the crystals and recovering the resulting dispersions of scattered particles. The particles with average size approximately 10 nm are obtained without dispersants or grinding agents for contamination prevention and are suitable for pigments, pharmaceuticals, etc.

WO 2004026967 discloses nanoparticles manufactured by dissolving organic pigments in organic solvents containing at least 50 vol. % amides and adding the organic solvent solutions in solvents, which are poor solvents for the pigments and compatible with the organic solvents, while stirring. Thus, quinacridone pigment was dissolved in 1-methyl-2-pyrrolidinone and added to water with stirring to give a fine particle with average crystal size 20 nm.

U.S. Patent Application Publication No. 2003/0199608 discloses a functional material comprising fine coloring particles having an average primary particle diameter of 1 to 50 nm in a dried state, and having a BET specific surface area value of 30 to 500 m.sup.2/g and a light transmittance of not less than 80%. The functional material composed of fine coloring particles, exhibits not only an excellent transparency but also a high tinting strength and a clear hue.

U.S. Pat. No. 6,837,918 discloses a process and apparatus that collects pigment nanoparticles by forming a vapor of a pigment that is solid at room temperature, the vapor of the pigment being provided in an inert gaseous carrying medium. At least some of the pigment is solidified within the gaseous stream. The gaseous stream and pigment material is moved in a gaseous carrying environment into or through a dry mechanical pumping system. While the particles are within the dry mechanical pumping system or after the nanoparticles have moved through the dry pumping system, the pigment material and nanoparticles are contacted with an inert liquid collecting medium.

U.S. Pat. No. 6,537,364 discloses a process for the fine division of pigments which comprises dissolving coarsely crystalline crude pigments in a solvent and precipitating them with a liquid precipitation medium by spraying the pigment solution and the precipitation medium through nozzles to a point of conjoint collision in a reactor chamber enclosed by a housing in a microjet reactor, a gas or an evaporating liquid being passed into the reactor chamber through an opening in the housing for the purpose of maintaining a gas atmosphere in the reactor chamber, and the resulting pigment suspension and the gas or the evaporated liquid being removed from the reactor through a further opening in the housing by means of overpressure on the gas entry side or underpressure on the product and gas exit side.

U.S. Pat. No. 5,679,138 discloses a process for making ink jet inks, comprising the steps of: (A) providing an organic pigment dispersion containing a pigment, a carrier for the pigment and a dispersant; (B) mixing the pigment dispersion with rigid milling media having an average particle size less than 100 μm; (C) introducing the mixture of step (B) into a high speed mill; (D) milling the mixture from step (C) until a pigment particle size distribution is obtained wherein 90% by weight of the pigment particles have a size less than 100 nanometers (nm); (E) separating the milling media from the mixture milled in step (D); and (F) diluting the mixture from step (E) to obtain an ink jet ink having a pigment concentration suitable for ink jet printers.

Japanese Patent Application Publications Nos. JP 2007023168 and JP 2007023169 discloses providing a pigment dispersion compound excellent in dispersibility and flowability used for the color filter which has high contrast and weatherability. The solution of the organic material, for example, the organic pigment, dissolved in a good solvent under the existence of alkali soluble binder (A) which has an acidic group, and a poor solvent which makes the phase change to the solvent are mixed. The pigment nanoparticles dispersed compound re-decentralized in the organic solvent containing the alkali soluble binder (B) which concentrates the organic pigment nanoparticles which formed the organic pigment as the particles of particle size less than 1 μm, and further has the acidic group.

Kazuyuki Hayashi et al., "Uniformed nano-downsizing of organic pigments through core-shell structuring," Journal of Materials Chemistry, 17(6), 527-530 (2007) discloses that mechanical dry milling of organic pigments in the presence of mono-dispersed silica nanoparticles gave core-shell hybrid pigments with uniform size and shape reflecting those of the inorganic particles, in striking contrast to conventional milling as a breakdown process, which results in limited size reduction and wide size distribution.

U.S. Patent Application Publication No. 2007/0012221 describes a method of producing an organic pigment dispersion liquid, which has the steps of: providing an alkaline or acidic solution with an organic pigment dissolved therein and an aqueous medium, wherein a polymerizable compound is contained in at least one of the organic pigment solution and the aqueous medium; mixing the organic pigment solution and the aqueous medium; and thereby forming the pigment as fine particles; then polymerizing the polymerizable compound to form a polymer immobile from the pigment fine particles.

Other publications of interest, and the aspects of which may be selected for embodiments of the present disclosure, include:

1) W. Herbst, K. Hunger, Industrial Organic Pigments, 2004 Wiley-VCH Third Edition, p. 452-472, "Quinacridone Pigments";
2) F. Kehrer, Chimia, 1974, vol. 28(4), p. 173-183, "Neuere Entwicklung auf den Gebiet der Chemie organischer Pigmentfarbstoffe";
3) B. R. Hsieh et al, Journal of Imaging Science and Technology, 2001, vol. 45(1), p. 37-42, "Organic Pigment Nanoparticle Thin Film Devices via Lewis Acid Pigment Solubilization and In Situ Pigment Dispersions";
4) SP 372316H. Bohler et al, Nov. 30, 1963; and
5) SP 404034H. Bohler, Jun. 30, 1966

The appropriate components and process aspects of each of the foregoing may be selected for the present disclosure in embodiments thereof, and the entire disclosure of the above-mentioned references are totally incorporated herein by reference.

SUMMARY

The present disclosure addresses these and other needs, by providing nanoscale quinacridone pigment particles, and methods for producing such nanoscale quinacridone pigment particles.

In an embodiment, the disclosure provides a nanoscale pigment particle composition, comprising:

a quinacridone pigment including at least one functional moiety, and a sterically bulky stabilizer compound including at least one functional group, wherein the functional moiety associates non-covalently with the functional group; and the presence of the associated stabilizer limits the extent of particle growth and aggregation, to afford nanoscale-sized particles.

In another embodiment, the disclosure provides a process for preparing nanoscale quinacridone pigment particles, comprising:

preparing a first solution comprising: (a) a crude quinacridone pigment including at least one functional moiety and (b) a liquid medium;

preparing a second solution comprising: (a) a sterically bulky stabilizer compound having one or more functional groups that associate non-covalently with the functional moiety, and (b) a liquid medium;

combining the first reaction mixture into the second reaction mixture to form a third solution and effecting a direct coupling reaction which forms a quinacridone pigment composition wherein the functional moiety associates non-covalently with the functional group and having nanoscale particle size.

In still another embodiment, the disclosure provides a process for preparing nanoscale quinacridone pigment particles, comprising:

preparing a first solution comprising a quinacridone pigment including at least one functional moiety in an acid;

preparing a second solution comprising an organic medium and a sterically bulky stabilizer compound having one or more functional groups that associate non-covalently with the functional moiety of the pigment;

treating the second solution containing with the first solution; and precipitating quinacridone pigment particles from the first solution, wherein the functional moiety associates non-covalently with the functional group and the quinacridone pigment particles have a nanoscale particle size.

In still another embodiment, the disclosure provides a marking composition, such as an ink composition or a toner composition, generally comprising at least the above nanoscale quinacridone pigment particles.

DETAILED DESCRIPTION OF EXEMPLARY EMBODIMENTS

Embodiments of the present disclosure provide nanoscale quinacridone pigment particles, and methods for producing such nanoscale quinacidone pigment particles.

The "average" particle size, typically represented as $D_{50}$, is defined as the median particle size value at the 50th percentile of the particle size distribution, wherein 50% of the particles in the distribution are greater than the $D_{50}$ particle size value and the other 50% of the particles in the distribution are less than the $D_{50}$ value. Average particle size can be measured by methods that use light scattering technology to infer particle size, such as Dynamic Light Scattering. The term "particle diameter" as used herein refers to the length of the pigment particle as derived from images of the particles generated by Transmission Electron Microscopy. The term "nanosized" (or "nanoscale: or "nanoscale sized") such as used in "nanosized pigment particles" refers to, for instance, an average particle size, $D_{50}$, of less than about 150 nm, such as about 1 nm to about 100 nm, or about 10 nm to about 80 nm.

The steric stabilizer can have the potential to associate itself with the pigment's and/or the pigment precursor's functional moieties via, for example, hydrogen bonding, van Der Waals forces, and aromatic pi-stacking such that a controlled crystallization of nanopigment particles occurs. That is, the steric stabilizer provides a functional group that is a complementary part to the functional moiety of the pigment and/or the pigment precursor. The term "complementary" as used in complementary functional moiety of the stabilizer indicates that the complementary functional moiety is capable of non-covalent chemical bonding such as "hydrogen bonding" with the functional moiety of the organic pigment and/or the functional moiety of the pigment precursor.

The term "precursor" as used in "precursor to the organic pigment" can be any chemical substance that is an advanced intermediate in the total synthesis of a compound (such as the organic pigment). In embodiments, the organic pigment and the precursor to the organic pigment may or may not have the same functional moiety. In embodiments, the precursor to the organic pigment may or may not be a colored compound. In embodiments, where the organic pigment and the precursor have a structural feature or characteristic in common, the phrase "organic pigment/pigment precursor" is used for convenience rather than repeating the same discussion for each of the organic pigment and the pigment precursor.

The functional moiety of the organic pigment/pigment precursor can be any suitable moiety capable of non-covalent bonding with the complementary functional moiety of the stabilizer. For the pigment, illustrative functional moieties include but are not limited to the following: carbonyl groups (C=O), and substituted amino groups such as for example phenyl-NH-phenyl. For the pigment precursor, functional moieties include but are not limited to carboxylic acid groups (COOH), ester groups (COOR, where R is any hydrocarbon), and substituted amino groups such as —NH-phenyl-$R_1$ and —NH-phenyl-$R_2$ where $R_1$, $R_2$ can be different or identical.

Representative precursors include the aniline terephthalic acids and their corresponding esters with any hydrocarbon chain R, as indicated in Formula 1 below. The hydrocarbon chain R can represent but is not limited to hydrogen, a straight or branched alkyl group with 1 to about 20 carbons such as methyl, ethyl, propyl, i-propyl, butyl and the like, or cyclic alkyl groups such as cyclohexyl, or any aromatic ring such as phenyl. The functional moieties $R_1$ and $R_2$ can be present at any position on the aniline aromatic ring such as ortho, meta or para they can be different or identical with each other and include the following functional groups: H, methyl, methoxy and halide (Cl, Br)

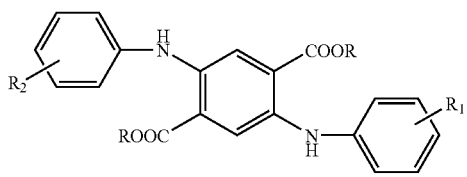

R=H or any hydrocarbon chain $R_1$=$R_2$=H
R=H or any hydrocarbon chain $R_1$=H; $R_2$=Halide (Cl, Br)
R=H or any hydrocarbon chain $R_1$=$R_2$=$CH_3$
R=H or any hydrocarbon chain $R_1$=H; $R_2$=$CH_3$
R=H or any hydrocarbon chain $R_1$=$CH_3$; $R_2$=Halide (Cl, Br)
R=H or any hydrocarbon chain $R_1$=$R_2$=Halide (Cl, Br)
R=H or any hydrocarbon chain $R_1$=Cl; $R_2$=Br
R=H or any hydrocarbon chain $R_1$=$R_2$=$OCH_3$
R=H or any hydrocarbon chain $R_1$=H; $R_2$=$OCH_3$
R=H or any hydrocarbon chain $R_1$=$OCH_3$; $R_2$=Halide (Cl, Br)

Formula 1

Quinacridone Precursors

The complementary functional moiety of the stabilizer can be any suitable moiety capable of non-covalent bonding with the functional moiety of the stabilizer. Illustrative compounds containing complementary functional moieties include but are not limited to the following classes: beta-amino carboxylic acids and their esters containing large aromatic moieties such as phenyl, benzyl, naphthyl and the like, long linear or branched aliphatic chains such as having about 5 to about 20 carbons such as pentyl, hexyl, heptyl, octyl, nonyl, decyl, undecyl and the like; beta-hydroxy carboxylic acids and their esters containing long linear, cyclic or branched aliphatic chains such as having 5 to about 20 carbons such as pentyl, hexyl, cyclohexyl, heptyl, octyl, nonyl, decyl, undecyl and the like; sorbitol esters with long chain aliphatic carboxylic acids such as lauric acid, oleic acid, palmitic acid, stearic acid; polymeric compounds such as polyvinylpyrrolidone, poly(1-vinylpyrrolidone)-graft-(1-hexadecene), poly(1-vinylpyrrolidone)-graft-(1-triacontene), and poly(1-vinylpyrrolidone-co-acrylic acid).

The sterically bulky group of the stabilizer can be any suitable moiety that limits the extent of particle self-assembly to nanosized particles. It is understood that "sterically bulky group" is a relative term requiring comparison with the size of the precursor/pigment; a particular group may or may not be "sterically bulky" depending on the relative size between the particular group and the precursor/pigment. In embodiments, the phrase "sterically bulky" refers to the spatial arrangement of a large group attached to a molecule. For instance, the steric stabilizer group of various commercially available SPAN®'s (esters of sorbitol with palmitic acid, stearic acid and oleic acid) for various organic magenta pigments such as Pigment Red 122, Pigment Red 202, and Pigment Violet 19, the long linear aliphatic chain of the acid is considered sufficiently "sterically bulky" to limit the extent of particle self-assembly to nanosized particles.

Representative stabilizers to enable nanosized particles include but are not limited to the following: mono and triesters of sorbitol (SPAN®'s) with palmitic acid (SPAN® 40), stearic acid (SPAN® 60) and oleic acid (SPAN® 85) where the aliphatic chain of the acid is considered sterically bulky; tartaric acid esters with cyclohexanol and Isofol 20 where the cyclohexane moiety and the branched chain of Isofol are considered sterically bulky; polymers such as polyvinylpyrrolidone, poly(1-vinylpyrrolidone)-graft-(1-hexadecene), poly(1-vinylpyrrolidone)-graft-(1-triacontene), poly(1-vinylpyrrolidone-co-acrylic acid) where the polymeric chain in itself is considered sterically bulky.

The non-covalent chemical bonding between the functional moiety of the precursor/pigment and the complementary functional moiety of the stabilizer is for example afforded by van der Waals' forces, ionic bonding, hydrogen bonding, and/or aromatic pi-stacking bonding. In embodiments, the non-covalent bonding is ionic bonding and/or hydrogen bonding but excluding aromatic pi-stacking bonding. In embodiments, the non-covalent bonding can be predominately hydrogen bonding or can be predominately aromatic pi-stacking bonding, where the term "predominately" indicates in this case the dominant nature of association of the stabilizer with the pigment particle.

Commercial pigments, having typical median particle sizes of at least about 100 nm to about 1 micron, have both varied particle size distributions and particle aspect ratios. The aspect ratio of a particle relates to its size dimension of length to its size dimension of width. Generally, a given particle's aspect ratio increases with its length dimension and, frequently, a given conventional pigment has a large particle size distribution as well as a large particle aspect ratio distribution; that is, the particles consist of a distribution of cuboids, rods, platelets, needles and the like. This can lead to inks or dispersions and the like made from such pigments having a large distribution of particle size and/or aspect ratio that is not preferred.

Nanopigments, properly synthesized using exemplary conditions and stabilizers outlined in the embodiments, which are totally incorporated herein by reference, typically have a more regular particle size distribution and aspect ratio, the latter having a preferred aspect ratio range of about 1:1 to about 4:1 (length:width) with the median particle size by intensity being less than about 100 nm as measured using a dynamic light scattering technique such as with a Malvern Zetasizer particle size analyzer.

An advantage of the processes and compositions of the disclosure is that they provide the ability to tune particle size and composition for the intended end use application of the quinacridone pigment. For example, the color of the nanosized pigment particles have the same general hue as is found with larger pigment particles. However, in embodiments, is disclosed coloristic properties of thin coatings onto Clear Mylar® of the nanosized pigment particles of quinacridone pigments dispersed in a polymer binder such as poly(vinyl butyral-co-vinyl alcohol-co-vinyl acetate), that exhibited a significant shift to lower hue angle and lower b* values that revealed more bluish hues, and having either no change or a small enhancement of a* value. In embodiments is disclosed the coloristic properties (hue angle, L*, a*, b*, and C*) of nanosized pigment particles, particularly of quinacridone pigments, that are directly correlated and tunable with the average pigment particle size, measured by either Dynamic Light Scattering or electron microscopy imaging techniques, as well as pigment composition with the non-covalently associated stabilizer, the latter which enables the control of particle size during pigment synthesis, and also enables enhanced dispersability within certain polymer binders for coating or other applications. In embodiments, it is known that as both the particle size and particle size distribution of pigment particles decreases, the more transparent the particles become. Preferably, this leads to an overall higher color purity of the pigment particles when they are dispersed onto various media via from being coated, sprayed, jetted, extruded, etc.

In embodiments, for the acid pasting of any suitable agent can be used to solubilize the pigment such that it is completely or almost completely molecularized before the action of re-precipitation into nanopigment particles. Representative examples, include, but are not limited to, sulfuric acid, nitric acid, various hydrohalic acids including hydrochloric acid, phosphoric acid, boric acid and mixtures thereof.

Any suitable liquid medium can be used during the precipitation phase of making nanopigment particles. Illustrative liquid media include but are not limited to the following organic compounds such as: N-methyl-2-pyrrolidinone, dimethyl sulfoxide, and N,N-dimethylformamide.

Any suitable precipitating agent optionally can be used. Illustrative precipitating agents include but are not limited to alcohols such as methanol, ethanol, 1-propanol, 2-propanol, preferably 2-propanol; deionized water and mixtures of thereof.

The steric stabilizer loading in the reaction can vary between about 5 to about 300 mol %, such as about 10 to about 150 mol %, or about 20 to about 70 mol % to pigment. Optionally, the concentration of the nanopigment in the final reaction mixture can be vary from 0.5% to 2% by weight, such as from 0.75% to 1.5% or about 1% by weight.

There are several methods for the preparation of quinacridone pigments: the thermal ring closure route, the acidic ring closure route and the dihalogen terephthalic acid process. The first two methods involve the total synthesis of the central aromatic ring and they are widely used by the pigment manufacturing industry. The last route starts from a ready made aromatic system and it involves three steps. In the first step the aromatic raw material 2,5-dihalo-1,4-xylene it is oxidized to produce 2,5-dihalo-terephthalic acid which is reacted in the second step with an aryl amine to afford 2,5-aryl-aminoterephthalic acid. In the last step, the 2,5-aminoterephthalic acid is cyclized under acidic conditions to produce the quinacridone pigment. (Formula 2).

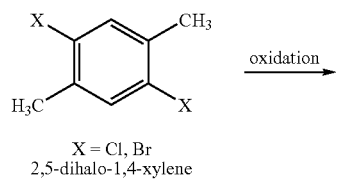

X = Cl, Br
2,5-dihalo-1,4-xylene

-continued

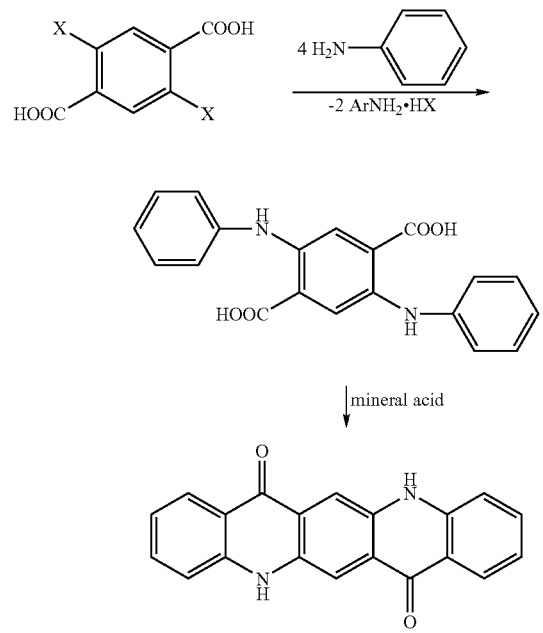

Formula 2

Dihaloterephthalic Acid Process

Quinacridone nanopigment can be prepared in two ways; acid pasting and reconstitution of the pigment (method of making I) and total synthesis of the pigment (method of making II).

In the method of making II, the stabilizer is added during the last synthesis step. The stabilizer can be used for any synthetic route that uses the acidic ring closure as the very last synthesis step to produce a quinacridone.

In the method of making I (pigment acid pasting and reconstitution), a solution of pigment in, for example, concentrated sulfuric acid is added slowly with vigorous stirring to a solution of a suitable solvent containing the optimum amount of steric stabilizer. During the addition, the temperature is maintained at about 20° C. to below about 60° C., although the re-precipitation of quinacridone into nanoparticles can be held isothermally within or outside this temperature range, in one embodiment and, in another embodiment, the temperature during re-precipitation of quinacridone into nanoparticles can also be allowed to cycle up and down within or outside this temperature range.

The formed nanoscale quinacridone pigment particles can be used, for example, as coloring agents in a variety of compositions, such as in liquid (aqueous or non-aqueous) ink vehicles, including inks used in conventional pens, markers, and the like, liquid ink jet ink compositions, solid or phase change ink compositions, and the like. For example, the colored nanoparticles can be formulated into a variety of ink vehicles, including "low energy" solid inks with melt temperatures of about 60 to about 140° C., solvent-based liquid inks or radiation or UV-curable liquid inks comprised of alkyloxylated monomers, and even aqueous inks. Various types of such compositions will now be described in more detail.

Ink jet ink compositions according to this disclosure generally include a carrier, a colorant, and one or more additional additives. Such additives can include, for example, solvents, waxes, antioxidants, tackifiers, slip aids, curable components such as curable monomers and/or polymers, gellants, initiators, sensitizers, humectants, biocides, preservatives, and the like. Specific types and amounts of components will depend, of course, on the specific type of ink composition, such as liquid, curable, solid, hot melt, phase change, gel, or the like. The formed nanoscale quinacridone pigment particles can be used, for example, in such inks as colorants.

Generally, the ink compositions contain one or more colorant. Any desired or effective colorant can be employed in the ink compositions, including pigment, dye, mixtures of pigment and dye, mixtures of pigments, mixtures of dyes, and the like. In embodiments, the colorant used in the ink composition consists entirely of the formed nanoscale quinacridone pigment particles. However, in other embodiments, the nanoscale quinacridone pigment particles can be used in combination with one or more conventional or other colorant material, where the nanoscale quinacridone pigment particles can form substantially most of the colorant material (such as about 90% or about 95% by weight or more), they can form a majority of the colorant material (such as at least 50% by weight or more), or they can form a minority of the colorant material (such as less than about 50% by weight). Two major advantages of using nanopigments over conventional pigments are: one to ensure reliable jetting of ink formulations (printhead reliability) and the second one is the enhanced coloristic performance of nanopigments will reduce the loading of pigment within the ink composition. In still other embodiments, the nanoscale quinacridone pigment particles can be included in the ink composition in any other varying amount, to provide either colorant and/or other properties to the ink composition.

The ink compositions can also optionally contain an antioxidant. The optional antioxidants of the ink compositions help to protect the images from oxidation and also help to protect the ink components from oxidation during the heating portion of the ink preparation process. Specific examples of suitable antioxidants include NAUGUARD® series of antioxidants, such as NAUGUARD® 445, NAUGUARD® 524, NAUGUARD® 76, and NAUGUARD® 512 (commercially available from Uniroyal Chemical Company, Oxford, Conn.), the IRGANOX® series of antioxidants such as IRGANOX®1010 (commercially available from Ciba Geigy), and the like. When present, the optional antioxidant can be present in the ink in any desired or effective amount, such as in an amount of from at least about 0.01 to about 20 percent by weight of the ink, such as about 0.1 to about 5 percent by weight of the ink, or from about 1 to about 3 percent by weight of the ink, although the amount can be outside of these ranges.

The ink compositions can also optionally contain a viscosity modifier. Examples of suitable viscosity modifiers include aliphatic ketones, such as stearone, and the like. When present, the optional viscosity modifier can be present in the ink in any desired or effective amount, such as about 0.1 to about 99 percent by weight of the ink, such as about 1 to about 30 percent by weight of the ink, or about 10 to about 15 percent by weight of the ink, although the amount can be outside of these ranges.

Other optional additives to the ink include clarifiers, such as UNION CAMP® X37-523-235 (commercially available from Union Camp); tackifiers, such as FORAL® 85, a glycerol ester of hydrogenated abietic (rosin) acid (commercially available from Hercules), FORAL® 105, a pentaerythritol ester of hydroabietic (rosin) acid (commercially available from Hercules), CELLOLYN® 21, a hydroabietic (rosin) alcohol ester of phthalic acid (commercially available from Hercules), ARAKAWA KE-311 Resin, a triglyceride of hydrogenated abietic (rosin) acid (commercially available from Arakawa Chemical Industries, Ltd.), synthetic polyterpene resins such as NEVTAC® 2300, NEVTAC® 100, and NEVTAC® 80 (commercially available from Neville Chemical Company), WINGTACK® 86, a modified synthetic polyterpene resin (commercially available from Goodyear), and the like; adhesives, such as VERSAMID® 757, 759, or 744 (commercially available from Henkel), plasticizers, such as UNIPLEX® 250 (commercially available from Uniplex), the phthalate ester plasticizers commercially available from Monsanto under the trade name SANTICIZER®, such as dioctyl phthalate, diundecyl phthalate, alkylbenzyl phthalate (SANTICIZER® 278), triphenyl phosphate (commercially available from Monsanto), KP-140®, a tributoxyethyl phosphate (commercially available from FMC Corporation), MORFLEX® 150, a dicyclohexyl phthalate (commercially available from Morflex Chemical Company Inc.), trioctyl trimellitate (commercially available from Eastman Kodak Co.), and the like; and the like. Such additives can be included in conventional amounts for their usual purposes.

The ink composition also includes a carrier material, or mixture of two or more carrier materials. The carrier material can vary, for example, depending upon the specific type of ink composition. For example, an aqueous ink jet ink composition can use water, or a mixture of water and one or more other solvents, as a suitable carrier material. Other ink jet ink compositions can use one or more organic solvents as a carrier material, with or without water.

In the case of a solid (or a phase change) ink jet ink composition, the carrier can include one or more organic compounds. The carrier for such solid ink compositions is typically solid at room temperature (about 20° C. to about 25° C.), but becomes liquid at the printer operating temperature for ejecting onto the print surface. Suitable carrier materials for solid ink compositions can thus include, for example, amides, including diamides, triamides, tetra-amides, and the like. Suitable triamides include, for example, those disclosed in U.S. Patent Publication No. 2004-0261656, the entire disclosure of which is incorporated herein by reference. Suitable other amides, such as fatty amides including monoamides, tetra-amides, mixtures thereof, are disclosed in, for example, U.S. Pat. Nos. 4,889,560, 4,889,761, 5,194,638, 4,830,671, 6,174,937, 5,372,852, 5,597,856, and 6,174,937, and British Patent No. GB 2 238 792, the entire disclosures of each are incorporated herein by reference. In embodiments where an amide is used as a carrier material, a triamide is particularly useful because triamides are believed to have structures that are more three-dimensional as compared to other amides such as diamides and tetraamides.

Other suitable carrier materials that can be used in the solid ink compositions include, for example, isocyanate-derived resins and waxes, such as urethane isocyanate-derived materials, urea isocyanate-derived materials, urethane/urea isocyanate-derived materials, mixtures thereof, and the like.

Additional suitable solid ink carrier materials include paraffins, microcrystalline waxes, polyethylene waxes, ester waxes, amide waxes, fatty acids, fatty alcohols, fatty amides and other waxy materials, sulfonamide materials, resinous materials made from different natural sources (such as, for example, tall oil rosins and rosin esters), and many synthetic resins, oligomers, polymers and copolymers, such as ethylene/vinyl acetate copolymers, ethylene/acrylic acid copolymers, ethylene/vinyl acetate/acrylic acid copolymers, copolymers of acrylic acid with polyamides, and the like, ionomers, and the like, as well as mixtures thereof. One or more of these materials can also be employed in a mixture with a fatty amide material and/or an isocyanate-derived material.

The ink carrier in a solid ink composition can be present in ink in any desired or effective amount. For example, the carrier can be present in an amount of about 0.1 to about 99 percent by weight of the ink, such as about 50 to about 98 percent by weight of the ink, or about 90 to about 95 percent by weight of the ink, although the amount can be outside of these ranges.

In the case of a radiation, such as ultraviolet light, curable ink composition, the ink composition comprises a carrier material that is typically a curable monomer, curable oligomer, or curable polymer, or a mixture thereof. The curable materials are typically liquid at 25° C. The curable ink composition can further include other curable materials, such as a curable wax or the like, in addition to the colorant and other additives described above.

The term "curable" refers, for example, to the component or combination being polymerizable, that is, a material that may be cured via polymerization, including for example free radical routes, and/or in which polymerization is photoinitiated though use of a radiation sensitive photoinitiator. Thus, for example, the term "radiation curable" refers is intended to cover all forms of curing upon exposure to a radiation source, including light and heat sources and including in the presence or absence of initiators. Example radiation curing routes include, but are not limited to, curing using ultraviolet (UV) light, for example having a wavelength of 200-400 nm or more rarely visible light, such as in the presence of photoinitiators and/or sensitizers, curing using e-beam radiation, such as in the absence of photoinitiators, curing using thermal curing, in the presence or absence of high temperature thermal initiators (and which are generally largely inactive at the jetting temperature), and appropriate combinations thereof.

Suitable radiation, such as UV, curable monomers and oligomers include, but are not limited to, acrylated esters, acrylated polyesters, acrylated ethers, acrylated polyethers, acrylated epoxies, urethane acrylates, and pentaerythritol tetraacrylate. Specific examples of suitable acrylated oligomers include, but are not limited to, acrylated polyester oligomers, such as CN2262 (Sartomer Co.), EB 812 (Cytec Surface Specialties), EB 810 (Cytec Surface Specialties), CN2200 (Sartomer Co.), CN2300 (Sartomer Co.), and the like, acrylated urethane oligomers, such as EB270 (UCB Chemicals), EB 5129 (Cytec Surface Specialties), CN2920 (Sartomer Co.), CN3211 (Sartomer Co.), and the like, and acrylated epoxy oligomers, such as EB 600 (Cytec Surface Specialties), EB 3411 (Cytec Surface Specialties), CN2204 (Sartomer Co.), CN110 (Sartomer Co.), and the like; and pentaerythritol tetraacrylate oligomers, such as SR399LV (Sartomer Co.) and the like. Specific examples of suitable acrylated monomers include, but are not limited to, polyacrylates, such as trimethylol propane triacrylate, pentaerythritol tetraacrylate, pentaerythritol triacrylate, dipentaerythritol pentaacrylate, glycerol propoxy triacrylate, tris(2-hydroxyethyl) isocyanurate triacrylate, pentaacrylate ester, and the like, epoxy acrylates, urethane acrylates, amine acrylates, acrylic acrylates, and the like. Mixtures of two or more materials can also be employed as the reactive monomer. Suitable reactive monomers are commercially available from, for example, Sartomer Co., Inc., Henkel Corp., Radcure Specialties, and the like.

In embodiments, the at least one radiation curable oligomer and/or monomer can be cationically curable, radically curable, or the like.

The radiation curable monomer or oligomer variously functions as a viscosity reducer, as a binder when the composition is cured, as an adhesion promoter, and as a crosslinking agent, for example. Suitable monomers can have a low molecular weight, low viscosity, and low surface tension and comprise functional groups that undergo polymerization upon exposure to radiation such as UV light.

In embodiments, the monomer is equipped with one or more curable moieties, including, but not limited to, acrylates; methacrylates; alkenes; allylic ethers; vinyl ethers; epoxides, such as cycloaliphatic epoxides, aliphatic epoxides, and glycidyl epoxides; oxetanes; and the like. Examples of suitable monomers include monoacrylates, diacrylates, and polyfunctional alkoxylated or polyalkoxylated acrylic monomers comprising one or more di- or tri-acrylates. Suitable monoacrylates are, for example, cyclohexyl acrylate, 2-ethoxy ethyl acrylate, 2-methoxy ethyl acrylate, 2(2-ethoxyethoxy)ethyl acrylate, stearyl acrylate, tetrahydrofurfuryl acrylate, octyl acrylate, lauryl acrylate, behenyl acrylate, 2-phenoxy ethyl acrylate, tertiary butyl acrylate, glycidyl acrylate, isodecyl acrylate, benzyl acrylate, hexyl acrylate, isooctyl acrylate, isobornyl acrylate, butanediol monoacrylate, ethoxylated phenol monoacrylate, oxyethylated phenol acrylate, monomethoxy hexanediol acrylate, beta-carboxy ethyl acrylate, dicyclopentyl acrylate, carbonyl acrylate, octyl decyl acrylate, ethoxylated nonylphenol acrylate, hydroxyethyl acrylate, hydroxyethyl methacrylate, and the like. Suitable polyfunctional alkoxylated or polyalkoxylated acrylates are, for example, alkoxylated, such as ethoxylated or propoxylated, variants of the following: neopentyl glycol diacrylates, butanediol diacrylates, trimethylolpropane triacrylates, glyceryl triacrylates, 1,3-butylene glycol diacrylate, 1,4-butanediol diacrylate, diethylene glycol diacrylate, 1,6-hexanediol diacrylate, tetraethylene glycol diacrylate, triethylene glycol diacrylate, tripropylene glycol diacrylate, polybutanediol diacrylate, polyethylene glycol diacrylate, propoxylated neopentyl glycol diacrylate, ethoxylated neopentyl glycol diacrylate, polybutadiene diacrylate, and the like.

In embodiments where the ink composition is a radiation curable ink composition, the ink composition includes at least one reactive monomer and/or oligomer. However, other embodiments can include only one or more reactive oligomers, only one or more reactive monomers, or a combination of one or more reactive oligomers and one or more reactive monomers. However, in embodiments, the composition includes at least one reactive (curable) monomer, and optionally one or more additional reactive (curable) monomers and/or one or more reactive (curable) oligomers.

The curable monomer or oligomer in embodiments is included in the ink in an amount of, for example, about 20 to about 90% by weight of the ink, such as about to about 85% by weight of the ink, or about 40 to about 80% by weight of the ink. In embodiments, the curable monomer or oligomer has a viscosity at 25° C. of about 1 to about 50 cP, such as about 1 to about 40 cP or about 10 to about 30 cP. In one embodiment, the curable monomer or oligomer has a viscosity at 25° C. of about 20 cP. Also, in some embodiments, it is desired that the curable monomer or oligomer is not a skin irritant, so that printed images using the ink compositions are not irritable to users.

Also in embodiments where the ink is a radiation curable ink, the composition further comprises an initiator, such as a photoinitiator, that initiates polymerization of curable components of the ink, including the curable monomer and the curable wax. The initiator should be soluble in the composition. In embodiments, the initiator is a UV-activated photoinitiator.

In embodiments, the initiator can be a radical initiator. Examples of suitable radical photoinitiators include ketones such as hydroxycyclohexylphenyl ketones, benzyl ketones, monomeric hydroxyl ketones, polymeric hydroxyl ketones, α-amino ketones, and 4-(2-hydroxyethoxy)phenyl-(2-hydroxy-2-propyl) ketone; benzoins; benzoin alkyl ethers; acyl phosphine oxides, metallocenes, benzophenones, such as 2,4,6-trimethylbenzophenone and 4-methylbenzophenone; trimethylbenzoylphenylphosphine oxides such as 2,4,6-trimethylbenzoyl-diphenyl-phosphine oxide; azo compounds; anthraquinones and substituted anthraquinones, such as, for example, alkyl substituted or halo substituted anthraquinones; other substituted or unsubstituted polynuclear quinines; acetophenones, thioxanthones; ketals; acylphosphines; thioxanthenones, such as 2-isopropyl-9H-thioxanthen-9-one; mixtures thereof; and the like. One suitable ketone is 1-[4-(2-hydroxyethoxy)-phenyl]-2-hydroxy-2-methyl-1-propane-1-one. In an embodiment, the ink contains an α-amino ketone, 1-[4-(2-hydroxyethoxy)-phenyl]-2-hydroxy-2-methyl-1-propane-1-one and 2-isopropyl-9H-thioxanthen-9-one. In another embodiment, the photoinitiator is one of the following compounds or a mixture thereof: a hydroxycyclohexylphenyl ketone, such as, for example, 1-hydroxycyclohexylphenyl ketone, such as, for example, Irgacure® 184 (Ciba-Geigy Corp., Tarrytown, N.Y.), having the structure:

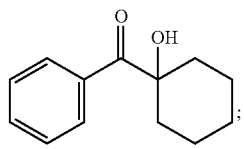

a trimethylbenzoylphenylphosphine oxide, such as, for example, ethyl-2,4,6-trimethylbenzoylphenylphosphinate, such as, for example, Lucirin® TPO-L (BASF Corp.), having the formula

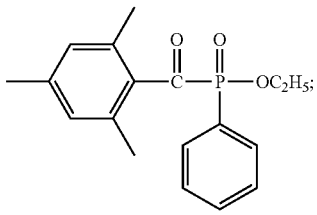

a mixture of 2,4,6-trimethylbenzophenone and 4-methylbenzophenone, such as, for example, SARCURE™ SR1137 (Sartomer); a mixture of 2,4,6-trimethylbenzoyl-diphenyl-phosphine oxide and 2-hydroxy-2-methyl-1-phenyl-propan-1-one, such as, for example, DAROCUR® 4265 (Ciba Specialty Chemicals); alpha-amino ketone, such as, for example, IRGACURE® 379 (Ciba Specialty Chemicals); 4-(2-hydroxyethoxy)phenyl-(2-hydroxy-2-propyl) ketone, such as, for example, IRGACURE® 2959 (Ciba Specialty Chemicals); 2-isopropyl-9H-thioxanthen-9-one, such as, for example, DAROCUR® ITX (Ciba Specialty Chemicals); and mixtures thereof.

In other embodiments, the initiator can be a cationic initiator. Examples of suitable cationic photoinitiators include aryldiazonium salts, diaryliodinuim salts, triarylselenonium salts dialkylphenacylsulfonium salts, triarylsulphoxonium salts, and aryloxydiarylsulfonium salts.

The total amount of initiator included in the ink may be, for example, about 0.5 to about 15%, such as about 1 to about 10%, by weight of the ink.

The ink, such as the radiation curable ink, may also optionally contain at least one gellant. The gellant can be included, for example, to control the viscosity of the ink composition before and/or after jetting. For example, suitable gellants include a curable gellant comprised of a curable polyamide-epoxy acrylate component and a polyamide component, a curable composite gellant comprised of a curable epoxy resin and a polyamide resin, and the like.

Suitable curable composite gellants include those described in U.S. Pat. Nos. 6,492,458 and 6,399,713, and U.S. Patent Publications Nos. US 2003/0065084, US 2007/0120921, and US 2007/0120924, the entire disclosures of which are incorporated herein by reference. The ink compositions can include the gellant in any suitable amount, such as about 1% to about 50% by weight of the ink. In embodiments, the gellant can be present in an amount of about 2% to about 20% by weight of the ink, such as about 5% to about 15% by weight of the ink, although the value can also be outside of this range.

In the uncured state, the radiation-curable ink composition in embodiments is a low viscous liquid and is readily jettable. For example, in embodiments, the ink has a viscosity of from 8 mPa-s to 15 mPa-s, such as from 10 mPa-s to 12 mPa-s, at a temperature between 60° C. and 100° C. In embodiments, the ink has a viscosity of from 105 to 107 mPa-s at a temperature of 50° C. or below, specifically at a temperature from 0° C. to 50° C. Upon exposure to a suitable source of curing energy, e.g., ultraviolet light, electron beam energy, or the like, the photoinitiator absorbs the energy and sets into motion a reaction that converts the liquid composition into a cured material. The monomer and/or oligomer in the composition contain functional groups that polymerize during exposure to the curing source to readily crosslink forming a polymer network. This polymer network provides printed image with, for example, durability, thermal and light stability, and scratch and smear resistance. Thus, the composition is particularly well-suited for ink-based images printed on substrates that may be subjected to heat or sunlight, because the composition provides a printed image that is resistant to cracking and fading and provides image permanence.

In contrast to the curable ink compositions, the solid or phase change ink compositions typically have melting points no lower than about 50° C., such as about 50° C. to about 160° C. or more. In embodiments, the ink compositions have a melting point of about 70° C. to about 140° C., such as about 80° C. to about 100° C., although the melting point can be outside of these ranges. The ink compositions also generally a have melt viscosity at the jetting temperature (such as typically about 75° C. to about 180° C., or about 100° C. to about 150° C. or about 120° C. to about 130° C., although the jetting temperature can be outside of these ranges) typically of about 2 to about 30 centipoise, such as about 5 to about 20 centipoise or about 7 to about 15 centipoise, although the melt viscosity can be outside of these ranges. Because image hardness tends to drop with lower viscosities, it is desired in embodiments that the viscosity be as low as possible while still retaining the desired degree of image hardness.

The ink compositions of the present disclosure can also optionally contain other materials, which may depend upon the type of printer in which the ink is used. For example, the carrier composition is typically designed for use in either a direct printing mode or an indirect or offset printing transfer system.

The ink compositions of the present disclosure can be prepared by any desired or suitable method. For example, in the case of solid or phase change inks, the ink ingredients can be mixed together, followed by heating, typically to a temperature of from about 60° to about 140° C., although the temperature can be outside of this range, and stirring until a homogeneous ink composition is obtained. In the case of liquid ink compositions, the ink ingredients can simply be mixed together with stirring to provide a homogeneous composition, although heating can also be used if desired or necessary to help form the composition.

In addition to ink compositions, the nanoscale quinacridone pigment particles can be used in a variety of other applications, where it is desired to provide a specific color to the composition. For example, the nanoscale quinacridone pigment particles can also be used in the same manner as conventional pigments in such uses as colorants for paints, resins, lenses, filters, printing inks, and the like according to applications thereof. By way of example only, the nanoscale pigment particles of embodiments can be used for toner compositions, which include polymer particles and nanoscale pigment particles, along with other optional additives, that are formed into toner particles and optionally treated with internal or external additives such as flow aids, charge control agents, charge-enhancing agents, filler particles, radiation-curable agents or particles, surface release agents, and the like. The toner composition of the present invention can be prepared by a number of known methods including extrusion melt blending of the toner resin particles, nanoscale pigment particles and other colorants and other optional additives, followed by mechanical comminution and classification. Other methods include those well known in the art such as spray drying, melt dispersion, extrusion processing, dispersion polymerization, and suspension polymerization. Further, the toner compositions can be prepared by emulsion/aggregation/coalescence processes, as disclosed in references U.S. Pat. No. 5,290,654, U.S. Pat. No. 5,278,020, U.S. Pat. No. 5,308,734, U.S. Pat. No. 5,370,963, U.S. Pat. No. 5,344,738, U.S. Pat. No. 5,403,693, U.S. Pat. No. 5,418,108, U.S. Pat. No. 5,364,729, and U.S. Pat. No. 5,346,797. The toner particles can in turn be mixed with carrier particles to form developer compositions. The toner and developer compositions can be used in a variety of electrophotographic printing systems.\

In embodiments, the present invention can include ink compositions which comprise an aqueous liquid vehicle and the nanopigment particles disclosed in this invention. The liquid vehicle can consist solely of water, or it can comprise a mixture of water and a water soluble or water miscible organic component, such as ethylene glycol, propylene glycol, diethylene glycols, glycerine, dipropylene glycols, polyethylene glycols, polypropylene glycols, amides, ethers, urea, substituted ureas, ethers, carboxylic acids and their salts, esters, alcohols, organosulfides, organosulfoxides, sulfones (such as sulfolane), alcohol derivatives, carbitol, butyl carbitol, cellusolve, tripropylene glycol monomethyl ether, ether derivatives, amino alcohols, ketones, N-methylpyrrolidinone, 2-pyrrolidinone, cyclohexylpyrrolidone, hydroxyethers, amides, sulfoxides, lactones, polyelectrolytes, methyl sulfonylethanol, imidazole, betaine, and other water soluble or water miscible materials, as well as mixtures thereof.

In other embodiments encompassing non-aqueous inks, the present invention of nanopigment particles can be applied towards solvent-borne inks such as petroleum-based inks which can include aliphatic hydrocarbons, aromatic hydrocarbons, and mixtures thereof, environmentally friendly soy and vegetable oil-based inks, linseed oil-based inks and other ink-based vehicles derived from natural sources. Other examples of ink vehicles for nanopigment particles include isophthalic alkyds, higher order alcohols and the like.

In still other embodiments, the present invention of nanopigment particles can be applied towards inks used in relief, gravure, stencil, and lithographic printing.

The invention will now be described in detail with respect to specific exemplary embodiments thereof, it being understood that these examples are intended to be illustrative only and the invention is not intended to be limited to the materials, conditions, or process parameters recited herein. All percentages and parts are by weight unless otherwise indicated.

EXAMPLES

Preparation of Magenta Quinacridone Nanoparticles

Example 1

(Method of Making I) Preparation of Nanopigment Red 202

Commercially available Pigment Red 202 (Bayer, Quindo Magenta RV-6883) (1.5 g, 0.004 mol) was dissolved with stirring in 20 mL concentrated sulfuric acid. The violet-indigo solution was added via a dropping funnel with stirring into a solution containing sorbitan monopalmitate (4.0 g, 0.01 mol) in 100 mL N-methyl-2-pyrrolidinone during a period of 60 minutes. The temperature of the reaction mixture was maintained below 40° C. (preferably at room temperature) during the addition. The suspension color changed from indigo to cherry red and finally raspberry red. At the end of the addition, the suspension was allowed to stir for another 30 minutes. The suspension was filtered using a glass frit. The solid was washed three times with dimethyl formamide and once with a mixture of 1:1 dimethyl formamide and deionized water. The resulting solid (1 g) was freeze dried overnight. The particle morphology and range in size observed by Transmission Electron Microscopy showed particles having a regular oval shape between about 30 to about 80 nm.

Example 2

(Method of Making I) Preparation of Nanopigment Red 122

Commercially available Pigment Red 122 (Dainichiseika ECR-186Y) (1.5 g, 0.0044 mol) was dissolved with stirring in 20 mL concentrated sulfuric acid. The violet-indigo solution was added via a dropping funnel with stirring into a solution containing sorbitan trioleate (2.95 g, 0.003 mol) in 100 mL N-methyl-2-pyrrolidinone during a period of 60 minutes. The temperature of the reaction mixture was maintained below 40° C. (preferably at room temperature) during the addition. The suspension color changed from indigo to cherry red and finally raspberry red. At the end of the addition, the suspension was allowed to stir for another 30 minutes. Isopropanol (50 mL) was added dropwise to the final slurry. The resulted suspension was filtered using a glass frit. The solid was washed three times with dimethyl formamide and once with a mixture of 1:1 dimethyl formamide and deionized water. The resulting solid (1 g) was freeze dried overnight; $D50=89\pm1.2$ nm, $GSD=1.5\pm0.02$. The particle morphology and range in size observed by Transmission Electron Microscopy showed particles having a regular platelets shape between about 30 to about 120 nm.

Example 3

(Method of Making I) Preparation of Nanopigment Red 122 Without the Steric Stabilizer Commercially available Pigment Red 122 (Dainichiseika ECR-186Y) (1.5 g, 0.0044 mol) was dissolved with stirring in 20 mL concentrated sulfuric acid. The violet-indigo solution was added via a dropping funnel with stirring into 100 mL of N-methyl-2-pyrrolidinone during a period of 60 minutes. The temperature of the reaction mixture was maintained below 40° C. (preferably at room temperature) during the addition. The suspension color changed from indigo to cherry red and finally raspberry red. At the end of the addition, the suspension was allowed to stir for another 30 minutes. Isopropanol (50 mL) was added dropwise to the final slurry. The resulted suspension was filtered using a glass frit. The solid was washed three times with dimethyl formamide and once with a mixture of 1:1 dimethyl formamide and deionized water. The resulting solid (1 g) was freeze dried over night; $D50=89\pm1.2$ nm, $GSD=1.5\pm0.02$. The particle morphology and range in size observed by Transmission Electron Microscopy showed particles having irregular rod-like and platelet shapes between about 30 and about 200 nm.

Example 4

Preparation of Nanopigment Red 122 (Method of Making II)

Synthesis of dichloro terephthalic acid; In a 250 mL round bottom flask were introduced 5 g (0.028 mol) 2,5-dichloro-p-xylene, 26 g (0.165 mol) potassium permanganate, 80 mL pyridine and 20 mL deionized water. The mixture was heated to 100° C. with stirring for 12 hours. The brown manganese oxide was filtered while the suspension was still hot, and the brown solid reslurried twice with 100 mL deionized water. The liquids were combined and the solvents removed in vacuum. The yellowish syrupy liquid obtained was acidified with hydrochloric acid to a pH of 1. The white solid was filtered using a glass frit and dried in a vacuum oven at 50° C. overnight. Yield: 53-87%.

Synthesis of 2,5-di-(p-toluidino)-terephthalic acids; In a 3 neck round bottom flask fitted with Argon inlet and magnetic stirring were charged; p-toluidine 23.19 g (0.216 mol), 2,5-dichloro-terephthalic acid 3.6 g (0.014 mol), anhydrous $K_2CO_3$ 4.6 g (0.033 mol), anhydrous Copper (II) acetate 0.060 g (0.00033 mol), potassium iodide 0.750 g (0.0045 mol), ethylene glycol 16.8 g (0.271 mol) and deionized water 3.8 g (0.211 mol). The mixture was heated to 130° C. for 12 hours under argon. The reaction mixture was cooled to room temperature and diluted with 50 mL deionized water. Hydrochloric acid was added with stirring up to a pH of 1. The resultant dark solid is filtered using a glass frit. The solid was then dissolved into a solution of pH 7 containing ammonium hydroxide (3 mL) and deionized water (250 mL). The undissolved solid was filtered. The resultant yellow-green solution was acidified with acetic acid up to a pH of 3÷4. Upon acidification a dark brown solid formed. The solid was filtered using a glass frit and dried in a vacuum oven at 100° C. overnight. The resultant yield was 31%.

Synthesis of the quinacridone PR122 nano; In a 250 mL round bottom flask fitted with a magnetic stirring bar were charged: 15 g polyphosphoric acid, 1 g powder of 2,5,di-(-toluidino)-terephthalic acids. The mixture was heated at 160° C. for two hours. A dark violet reddish color appeared. The reaction mixture was allowed to cool at room temperature and was diluted with 80 mL concentrated sulfuric acid. The resultant solution was transferred into a dropping funnel. The purple solution was added dropwise with stirring to a resin kettle containing 100 mL N-methyl-2-pyrrolidinone and 1.96 g (0.002 mol) SPAN 85. During the addition, the temperature was maintained below 45° C. When the addition finished, the mixture was stirred at room temperature for 30 minutes and filtered using a glass frit. The resulted solid was reslurried in 300 mL isopropanol, filtered on a glass frit and reslurried in 300 mL deionized water. After filtration on a glass frit the product was freeze dried for 48 hours. The resultant yield was 50%. ($D50=100\pm1.4$ nm, $GSD=1.71\pm0.04$) The particle morphology and range in size observed by Transmission Electron Microscopy showed regularly shaped particles consisting of thin, rounded platelets between about 50 and about 100 mm.

Example 5a

Preparation of Dispersion Using Conventional Pigment

A dispersion of the pigment made in Example 2 was dispersed in the following manner. 0.062 g Poly(styrene-b-4-vinylpyridine) obtained from Xerox Corporation and 6.97 g toluene (analytical reagent grade from Caledon Laboratories) were added to a 30 mL bottle. To this were added 70.0 g of ⅛ inch diameter 440C Grade 25 steel balls available from Hoover Precision Products, Inc. 0.14 g of the commercial pigment used in Example 1 were added to the bottle and placed on a jar mill with the speed adjusted such that the bottle was rotating at about 7 cm/s for 4 days. The resultant dispersion had low viscosity and good wettability characteristics and was hence dispersed.

Example 5b

Preparation of Dispersion Using Conventional Pigment

A dispersion of the commercial pigment used in Example 2 was prepared in the same manner as in Example 5a. The resultant dispersion had low viscosity and good wettability characteristics and was hence dispersed.

Example 5c

Preparation of Dispersions Using Nanopigment

A dispersion of the nanopigment made in Example 1 was prepared in the same manner as in Example 5a. The resultant dispersion had low viscosity and excellent wettability characteristics and was hence dispersed.

Example 5d

Preparation of Dispersions Using Nanopigment

A dispersion of the nanopigment made in Example 2 was prepared in the same manner as in Example 5a. The resultant dispersion had low viscosity and excellent wettability characteristics and was hence dispersed.

Example 5e

Preparation of Dispersions Using Nanopigment

A dispersion of the nanopigment made in Example 3 was prepared in the same manner as in Example 5a. The resultant dispersion had low viscosity and good wettability characteristics and was hence dispersed.

Example 5f

Preparation of Dispersions Using Nanopigment

A dispersion of the nanopigment made in Example 2 was prepared in the same manner as in Example 5a. The resultant dispersion had low viscosity and excellent wettability characteristics and was hence dispersed. The dispersion also had a very pronounced blue-shifted hue compared to those dispersions made in Examples 5a, 5b, 5c, 5d and 5e.

Example 6a

Thermal Stability of Nanopigment Dispersion

A dispersion of the pigment made in Example 2 was dispersed in the following manner. To a 30 mL bottle were added 0.82 g Stearyl Alcohol (available from Proctor Gamble, Inc.), 1.53 g Isopar V (available from Alfa Chemicals Ltd.), and 4.12 g analytical grade n-Butanol (available from Caledon Laboratories Ltd.) and was heated slightly to effect dissolution of the stearyl alcohol. To this homogeneous solution cooled down to room temperature were added 70.0 g of ⅛ inch diameter 440C Grade 25 steel balls available from Hoover Precision Products, Inc. 0.047 g of the pigment from Example 1 were added to the bottle and placed on a jar mill with the speed adjusted such that the bottle was rotating at about 7 cm/s for 4 days. 1.5 g of the resultant dispersion was transferred to a 1 dram vial and allowed to remain in an oven at 120° C. where the dispersion's viscosity and thermal stability were qualitatively assessed. The n-butanol, while acting as a compatibilizer for the Isopar V and Stearyl alcohol at room temperature, slowly evaporated away leaving the one-phase Stearyl alcohol/Isopar V as sole vehicle for the pigment dispersion system at 120° C. The low-viscosity dispersion showed excellent stability at 120° C. where no settling of pigment particles from the vehicle was observed over a 17 day period.

Example 6b

Thermal Stability of Nanopigment Dispersion

A dispersion of the nanopigment made in Example 4 was prepared in the same manner as in Example 6a. The dispersion showed excellent stability at 120° C. where no physical separation of pigment from vehicle was observed over a 2 week period. The dispersion's viscosity remained low after 8 days at 120° C. and became higher only after 12 days at 120° C.

Example 7

Ink Concentrate Comprising Nanopigment PR122Particles

An ink concentrate was made based on the nanopigment made in Example 2. Into a Szegvari 01 attritor available from Union Process were charged 1800.0 g ⅛ inch diameter 440C Grade 25 steel balls available from Hoover Precision Products, Inc. The following components were added together and melt-mixed at 120° C. in a 600 mL beaker: 114.8 g of a distilled Polyethylene Wax from Baker Petrolite, 11.1 g of a triamide wax (triamide described in U.S. Pat. No. 6,860,930), 22.3 g KE-100 resin commercially available from Arakawa Corporation, 0.3 g Naugard-445 (an antioxidant) available from Crompton Corp. 8.04 g of OLOA® 11000, available from Chevron Corporation, were added to the above solution and stirred to complete dissolution. The resultant solution was quantitatively transferred to the attritor vessel. To the attritor vessel were added 5.39 g of pigment from Example 2. A multi-staged impeller was then attached to the attritor and the speed adjusted to give an impeller tip velocity of about 4.5 cm/s. The pigmented mixture was allowed to attrite overnight for about 19 hours upon which the resultant ink concentrate showed excellent free-flowing behavior which was then discharged and separated from the steel balls in its molten state.

Example 8

Dilution of Ink Concentrate Comprising Nanopigment PR122Particles

The pigmented ink concentrate from Example 7 is diluted in the following manner. 82.8 g of the concentrate in Example 7 was diluted with 57.2 g of a molten and thoroughly mixed solution diluent of the following: 28.4 g of a distilled Polyethylene Wax from Baker Petrolite, 8.74 g of a triamide wax (triamide described in U.S. Pat. No. 6,860,930), 8.95 g S-180 (a stearyl stearamide) commercially available from Crompton Corporation, 22.3 g KE-100 resin commercially available from Arakawa Corporation, 0.3 g Naugard-445 (an antioxidant) available from Crompton Corporation, 0.62 g OLOA® 11000, available from Chevron Corporation. The solution was added to a heated separatory funnel and then allowed to be added drop-wise to 82.8 g of the concentrate in Example 7 while the concentrate was stirring at 400 RPM while in an oven. After addition of the diluent to the concentrate, the working ink's pigment concentration was 2% by weight. The ink was allowed to remain stirring for 3.5 hours upon which it showed good wettability characteristics and good thermal stability over 7 days at 120° C. where no visual settling occurred.

Example 9

Coloristic Data for Coatings made from Dispersions

The following data in Table 1 shows the relative coloristic data obtained from 8-path coatings on Clear Mylar® from toluene-based dispersions prepared in Examples 5a, 5b, 5c, 5d, 5e and 5f. An X-RITE 938 spectrodensitometer was used to assess the coloristic properties. The data below were normalized to magenta O.D.=1.5.

TABLE 1

Comparison of Coloristic Properties of Various PR122 Quinacridones on Clear Mylar ® cast from Toluene-based Dispersions, Magenta O.D. = 1.5

| Metric | Reference Conventional Pigment PR202, Bayer Quindo Magenta RV-6883 | Reference Conventional Pigment Danichiseika PR122, ECR-186Y | Nano PR202 from Example 1 | Nano PR122 from Example 2 | Nano PR122 from Example 3 | Nano PR122 from Example 4 |
|---|---|---|---|---|---|---|
| L* | 53.43 | 51.69 | 54.09 | 51.44 | 53.59 | 51.80 |
| a* | 79.08 | 77.70 | 80.92 | 78.92 | 79.50 | 78.79 |
| b* | −33.90 | −33.13 | −36.12 | −36.60 | −33.5 | −38.70 |
| Hue Angle (deg) | 336.8 | 336.7 | 336.0 | 335.1 | 337.1 | 333.8 |
| C* | 86.1 | 84.6 | 88.6 | 87.0 | 86.3 | 87.8 |

The data in Table 1 clearly shows the enhanced chroma of the coatings based on nanopigments over those coatings made with their respective conventional pigment analogs. Enhanced chroma as well as significantly blue-shifted hue angle was realized with synthesized PR122 described in Example 4.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A nanoscale pigment particle composition, comprising:
   a quinacridone pigment having at least one functional moiety, and
   a sterically bulky stabilizer compound having at least one functional group,
   wherein the functional moiety associates non-covalently with the functional group; and
   presence of the associated stabilizer limits an extent of particle growth and aggregation, to afford nanoscale-sized particles.

2. The composition of claim 1, wherein the quinacridone pigment includes at least two different functional moieties.

3. The composition of claim 1, wherein the nanoscale-sized particles have an average particle diameter as derived from Transmission Electron Microscopy of less than about 150 nm.

4. The composition of claim 1, wherein the quinacridone pigment is formed from a quinacridone precursor selected from the group consisting of aniline terephthalic acid and their esters thereof, with any alkyl chain of from 1 to about 20 carbon atoms.

5. The composition of claim 1, wherein the at least one functional group of the sterically bulky stabilizer is selected from the group consisting of beta-amino carboxylic acids and their salts and esters containing at least aromatic moieties or linear or branched aliphatic chains having about 5 to about 20 carbons; beta-hydroxy carboxylic acids and their esters containing linear or branched aliphatic chains having 5 to about 20 carbons; sorbitol esters with chain aliphatic carboxylic acids having 5 to about 20 carbons; and polymeric compounds.

6. The composition of claim 1, wherein the sterically bulky stabilizer is selected from the group consisting of mono and triesters of sorbitol with palmitic acid, stearic acid, or and oleic acid; tartaric acid esters with cyclohexanol; and polymers.

7. The composition of claim 1, wherein the non-covalent association between the quinacridone pigment and the sterically bulky stabilizer compound is at least one of van der Waals' forces, ionic bonding, coordination bonding, hydrogen bonding, and aromatic pi-stacking bonding.

8. The composition of claim 1, wherein the quinacridone pigment particles have an average aspect ratio (length:width) of from about 1:1 to about 4:1.

9. The composition of claim 1, wherein the nanoscale pigment particle composition has coloristic properties that are changeable as a function of particle size of the nanoscale-sized particles.

10. The composition of claim 9 wherein the coloristic properties are selected from the group consisting of L*, a*, b*, hue, and chroma.

11. The composition of claim 1, wherein the nanoscale pigment particle composition has enhanced chroma as defined by C* in CIELAB compared to a similar quinacridone pigment not having the sterically bulky stabilizer compound and not being of nanoscale-size.

12. The composition of claim 1, wherein the quinacridone pigment is formed from a quinacridone precursor selected from the group consisting of compounds of Formula (1):

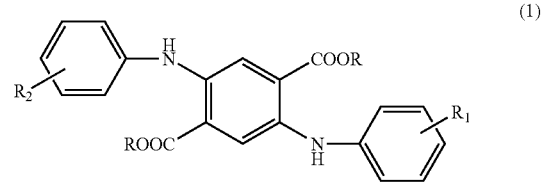

(1)

wherein R represents hydrogen, a linear, branched or cyclic alkyl group having from 1 to about 20 carbon atoms, or an aromatic ring; $R_1$ and $R_2$ each independently represents H, methyl, methoxy, or halide atoms.

13. The composition of claim 12, wherein the quinacridone pigment is formed from a quinacridone precursor selected from the group consisting of:
   a) compound of the formula (1) wherein $R_1=R_2=H$;
   b) compound of the formula (1) wherein $R_1=H$, $R_2=$halide;
   c) compound of the formula (1) wherein $R_1=R_2=CH_3$;
   d) compound of the formula (1) wherein $R_1=H$, $R_2=CH_3$;
   e) compound of the formula (1) wherein $R_1=CH_3$, $R_2=$halide;

f) compound of the formula (1) wherein $R_1=R_2=$halide;
g) compound of the formula (1) wherein $R_1=Cl, R_2=Br$;
h) compound of the formula (1) wherein $R_1=R_2=OCH_3$;
i) compound of the formula (1) wherein $R_1=H, R_2=OCH_3$; and
j) compound of the formula (1) wherein $R_1=OCH_3, R_2=$halide.

14. A process for preparing nanoscale quinacridone pigment particles, comprising:
preparing a first solution comprising: (a) a crude quinacridone pigment having at least one functional moiety and (b) a liquid medium;
preparing a second solution comprising: (a) a sterically bulky stabilizer compound having one or more functional groups that associates non-covalently with the functional moiety, and (b) a liquid medium;
combining the first solution into the second solution to form a third solution and
effecting a direct coupling reaction which forms a quinacridone pigment composition wherein the functional moiety associates non-covalently with the functional group and having nanoscale particle size.

15. The process of claim 14, wherein the liquid medium of the first solution comprises a mineral acid or an organic acid with an optional solvent.

16. The process of claim 14, wherein the liquid medium of the second solution comprises an organic solvent and optionally an organic co-solvent or water.

17. The process of claim 14, wherein the combining is conducted at ambient temperature with stirring.

18. The process of claim 14, wherein the sterically bulky stabilizer compound is present in an amount of from about 0.05 to about 3 moles per mole of quinacridone pigment.

19. The process of claim 14, wherein a concentration of the quinacridone pigment composition present in the third solution is from about 0.5% to about 2% by weight.

20. A process for preparing nanoscale quinacridone pigment particles, comprising:
preparing a first solution comprising a quinacridone pigment having at least one functional moiety in an acid;
preparing a second solution comprising an organic medium and a sterically bulky stabilizer compound having one or more functional groups that associate non-covalently with the functional moiety of the pigment;
adding the first solution to the second solution; and
precipitating quinacridone pigment particles from the first solution, wherein the functional moiety associates non-covalently with the functional group and the quinacridone pigment particles have a nanoscale particle size.

21. The process of claim 20, wherein the acid is selected from the group consisting of mineral acids and organic acids.

22. An ink composition comprising:
a carrier, and
a colorant comprising a nanoscale pigment particle composition according to claim 1.

23. The ink composition of claim 22, wherein the carrier is present in an amount of about 50 to about 99.9 weight %, and said colorant is present in an amount of about 0.1 to about 50 weight % by weight of the ink.

24. The ink composition of claim 22, wherein the carrier comprises one or more organic compounds that are solid at room temperature but becomes liquid at a printer operating temperature for ejecting the ink composition onto a print surface.

25. The ink composition of claim 22, wherein the carrier is selected from the group consisting of amides, isocyanate-derived resins and waxes, paraffins, microcrystalline waxes, polyethylene waxes, ester waxes, amide waxes, fatty acids, fatty alcohols, fatty amides, sulfonamide materials, and synthetic resins, oligomers, polymers and copolymers, and mixtures thereof.

26. The ink composition of claim 22, wherein the carrier comprises a curable material selected from the group consisting of radiation curable monomers, radiation curable oligomers, radiation curable polymers, and mixtures thereof, that is liquid at room temperature.

27. The ink composition of claim 22, wherein the ink composition is selected from the group consisting of solid ink compositions, phase change ink compositions, curable ink compositions, aqueous ink compositions, and non-aqueous ink compositions.

28. The ink composition of claim 22, further comprising at least one additive selected from the group consisting of surfactants, light stabilizers, UV absorbers, optical brighteners, thixotropic agents, dewetting agents, slip agents, foaming agents, antifoaming agents, flow agents, oils, plasticizers, binders, electrical conductive agents, fungicides, bactericides, organic and inorganic filler particles, leveling agents, opacifiers, antistatic agents, dispersants, and mixtures thereof.

29. The ink composition of claim 22, where the colorant consists of said nanoscale pigment particle composition, and said nanoscale pigment particle composition is the only colorant present in the ink composition.

30. The ink composition of claim 22, where the colorant comprises said nanoscale pigment particle composition and at least one other colorant material.

* * * * *